2,861,023

FUNGICIDAL COMPOSITIONS AND METHODS OF DESTROYING FUNGI EMPLOYING TRIALKYL TETRA-THIOPHOSPHATES

Carleton B. Scott, Pomona, and John W. Yale, Jr., Yorba Linda, Calif., assignors, by mesne assignments, to Collier Carbon and Chemical Corporation, a corporation of California No Drawing. Application September 6, 1955
Serial No. 532,803

9 Claims. (Cl. 167—22)

This invention relates to new fungicidal compositions, and in particular concerns fungicidal compositions comprising as the essential active ingredient a trialkyl tetrathiophosphate in which at least two of the alkyl groups are methyl groups.

In U. S. Patent 2,063,629, Salzberg and Wertz describe a number of higher alkyl esters of various thio acids of phosphorus, including the tridodecyl ester of tetrathiophosphoric acid, and allege that such esters have insecticidal properties. We have now found that in contrast to such higher trialkyl tetrathiophosphates, the lower members of the homologous series have exceptional fungicidal properties. More particularly, we have found that trialkyl tetrathiophosphates of the general formula:

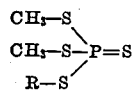

wherein R represents an alkyl group containing from 1 to 6 carbon atoms, differ from their higher homologs in being fungicidally active to an exceptional degree. Apparently, the center of fungicidal activity resides in the

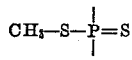

configuration since, as is hereinafter shown, trimethyl tetrathiophosphate displays excellent fungicidal activity whereas its next highest homolog, triethyl tetrathiophosphate is relatively inactive in this respect. The invention thus consists in fungicidal compositions comprising a compound having the above general formula as the essential active ingredient. As examples of such fungicidal compounds within the scope of the invention, there may be mentioned trimethyl tetrathiophosphate, dimethyl ethyl tetrathiophosphate, dimethyl isopropyl tetrathiophosphate, dimethyl sec.-amyl tetrathiophosphate, dimethyl tert.-butyl tetrathiophosphate, dimethyl n-hexyl tetrathiophosphate etc.

The active ingredient of the compositions provided by the invention is formed, at least in part, by reaction between methyl mercaptan and phosphorus pentasulfide. In preparing trimethyl tetrathiophosphate, at least 3 (and preferably between about 3 and about 10) moles of methyl mercaptan are provided per mole of phosphorus pentasulfide. In preparing esters containing two methyl groups and one other alkyl group, the phosphorus pentasulfide is first reacted with about 2 or less molecular equivalents of methyl mercaptan to form dimethyl tetrathiophosphoric acid, $(CH_3S)_2P(S)SH$, and the latter is thereafter reacted, with or without purification and isolation, with an olefine containing from 2 to 6 carbon atoms.

All of the foregoing reactions occur readily at temperatures between about 50° C. and about 200° C. and under autogenic pressure. Conveniently, the reactants are simply admixed and placed in a pressure vessel and heated at the desired reaction temperature until reaction is complete. In most instances, the reaction is relatively slow, requiring between about ½ and about 20 hours for completion. If desired, use may be made of an inert reaction medium such as benzene or toluene. Upon completion of the reaction, the reaction vessel is cooled and vented to remove any volatile by-products or unreacted reactants, and the desired product is isolated from the crude reaction product by fractional distillation under vacuum. In some instances, particularly when the product is to be further reacted to obtain the desired tetrathiophosphate, the fractional distillation step may be dispensed with.

The following examples will illustrate the preparation of several of the trialkyl tetrathiophosphates of the present class, but are not to be construed as limiting the invention. All proportions are given in parts by weight.

Example 1

A mixture consisting of 3.5 moles of phosphorus pentasulfide and 42 moles of methyl mercaptan was placed in a pressure vessel and heated for 3 hours at a temperature of about 95° C. During the reaction the pressure within the vessel was maintained at about 195 p. s. i. g. by venting the vessel through a pressure relief valve set to open at such pressure. The gas thus vented from the vessel was substantially pure hydrogen sulfide. The vessel was then cooled to room temperature and the excess methyl mercaptan was vented off. Upon distillation of the liquid reaction product, trimethyl tetrathiophosphate, $(CH_3S)_3PS$, was obtained as a colorless oil distilling at 125°–130° C. under 1 mm. pressure and having the following analysis:

|  | Calc. | Found |
| --- | --- | --- |
| Carbon | 17.7 | 17.1 |
| Hydrogen | 4.4 | 4.3 |
| Phosphorus | 15.2 | 15.1 |
| Sulfur | 62.6 | 62.8 |

Upon being allowed to stand at room temperature the compound crystallized to form very large white crystals melting at about 30° C.

Example 2

Methyl trithiometaphosphate, $CH_3SPS_2$, was obtained as a yellow crystalline solid by heating 1000 parts of phosphorus pentasulfide, 432 parts of methyl mercaptan and 800 parts of benzene at about 95° C. and 100 p. s. i. g. pressure for 4 hours, after which the benzene was evaporated off and the product was purified by recrystallization from benzene. Approximately 1 mole of this material was slurried in 140 parts of diethyl ether and was admixed with a solution of 1 mole of methyl mercaptan in 70 parts of diethyl ether. The mixture so obtained was heated at reflux temperature for 22 hours, after which the ether was evaporated off, leaving a residue of crude dimethyl tetrathiophosphoric acid, $(CH_3S)_2P(S)SH$. Approximately 0.5 mole of this latter material and about 1.0 mole of propylene were placed in a closed vessel and heated at about 135° C. for about 2½ hours. During the heating the pressure within the vessel increased to a maximum of about 370 p. s. i. g. and then decreased to about 150 p. s. i. g. The reaction product was then fractionally distilled to obtain dimethyl i-propyl tetrathiophosphate, $(CH_3S)_2(C_3H_7S)PS$, as a light yellow oil distilling at 125°–135° C. under 0.8 mm. pressure and having the following analysis:

|  | Calc. | Found |
|---|---|---|
| Carbon | 25.8 | 26.0 |
| Hydrogen | 5.6 | 5.7 |
| Phosphorus | 13.4 | 13.7 |
| Sulfur | 55.1 | 55.2 |

The fungicidal compositions of the present invention are prepared by combining one or a mixture of the above-defined class of trialkyl tetrathiophosphates with a liquid or solid inert carrier material in the conventional manner. Thus, one or a mixture of such compounds may be dispersed in water with the aid of a dispersing agent to form a concentrate composition which is subsequently diluted with water to form a spray suitable for direct application to living plants, lumber, and other materials subject to fungus attack. Alternatively, the tetrathiophosphate ester may be admixed with an inert solid diluent such as talc, starch, diatomaceous earth, aluminum silicate, etc. to form a dusting composition which can be employed as such or dispersed in an aqueous or oleaginous medium to form a spray. In general, any of the conventional formulation and application techniques may be applied in employing the present class of fungicidal agents, and any of the various known wetting agents, spreaders, sticking agents, diluents, etc. may be employed in combination with such agents. The latter are substantially nonphytotoxic and may accordingly be applied to living plants in relatively concentrated form. However, as will be apparent from the test data presented below, the fungicides of the present class are highly effective in very small quantities, and in the interests of economy they are usually applied at concentrations of the order of 10–1000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrates usually contain between about 5 and about 25 percent by weight of the active ingredient and, optionally, small amounts of spreading agents and other conventional adjuvants.

The following examples will illustrate the formulation of a number of fungicidal compositions comprising members of the present class of tetrathiophosphates as the primary toxic agent, but are not to be construed as limiting the invention:

Example 3

|  | Pounds |
|---|---|
| Trimethyl tetrathiophosphate | 2.5 |
| Attapulgus clay | 2.5 |
| Aluminum silicate | 45.0 |
| Powdered blood albumin | 0.25 |

Example 4

|  | Pounds |
|---|---|
| Dimethyl n-hexyl tetrathiophosphate | 2.5 |
| Water | 50.0 |
| Powdered blood albumin | 0.25 |

The toxic agent and blood albumin are added to the water, and the mixture is then passed through a colloid mill or high speed blender to obtain a concentrate composition which can be diluted 1000:1 with water to obtain a fungicidal spray for application to living plants.

Example 5

|  | Pounds |
|---|---|
| Dimethyl isopropyl tetrathiophosphate | 0.5 |
| Benzene | 1.8 |
| Non-phytotoxic spray oil | 4000 |

This composition is suitable as a tree spray.

Example 6

|  | Pounds |
|---|---|
| Dimethyl ethyl tetrathiophosphite | 10.0 |
| Kerosene extract oil | 100.0 |

This composition is suitable for the impregnation of lumber.

Example 7

|  | Pounds |
|---|---|
| Dimethyl isobutyl tetrathiophosphate | 2.5 |
| Water | 50.0 |
| Commercial spreading agent | 0.5 |
| Commercial sticking agent | 0.5 |

The ingredients are mixed in a colloid mill and thereafter diluted with 1200 gallons of water to obtain a spray composition containing about 250 parts per million of the active ingredient.

In order to demonstrate the activity of the present class of fungicides, the following test procedure is employed: A 2.5 gram sample of the compound to be tested and 2 drops of a non-ionic dispersing agent (Triton–171, manufactured by Rohm & Haas Co.) are added to 47.5 grams of water and the mixture is homogenized for 3 minutes in a high speed blender. With the blender still operating, 1 gram of the liquid is removed therefrom and stirred into 50 grams of liquid potato dextrose agar at 40° C., and the agar is transferred to a Petri dish. The agar so prepared thus contains 1000 p. p. m. of the compound to be tested; if lower concentrations are to be tested, e. g. 10 or 100 p. p. m., 1-gram portions of the concentrate composition in the blender is diluted with agar accordingly. The agar is allowed to cool to room temperature, whereupon it solidifies, and a ¼" disc of the test fungus innoculum is placed on the surface of the agar. The inoculated agar is incubated at room temperature for two days, after which it is examined for fungus growth and rated as follows:

1=Complete inhibition of fungus growth.
2=Growth on innoculum only.
3=At leas 50% of radial growth inhibited.
4=Less than 50% of radial growth inhibited.
5=No discernable inhibition of growth.

The following tabulation presents the data obtained by subjecting trimethyl tetrathiophosphate to the foregoing test procedure, employing a variety of test organisms.

| Test Organism | Fungicidal Rating at— | | | | |
|---|---|---|---|---|---|
|  | 0 p. p. m. | 10 p. p. m. | 50 p. p. m. | 100 p. p. m. | 1,000 p. p. m. |
| Fusarium oxysporum | 5 | 5 | 3 | 2 | 2 |
| Streptomyces scabies | 5 | 5 | 2 | 1 | 1 |
| Fusarium solani | 5 | 5 | 4 | 2 | 2 |
| Verticillium albo-atrum | 5 | 5 | 2 | 2 | 1 |
| Phytophthora cinnamoni | 5 | 2 | 2 | 1 | 1 |
| Rhizoctonia solani | 5 | 3 | 1 | 1 | 1 |
| Pythium ultimum | 5 | 3 | 1 | 1 | 1 |
| Sclerotinia sclerotiorum | 5 | 3 | 1 | 1 | 1 |
| Sclerotium rolfsii | 5 | 3 | 1 | 1 | 1 |
| Botrytis cinerea | 5 | 2 | 1 | 1 | 1 |
| Sclerotinia fructicola | 5 | 2 | 1 | 1 | 1 |

The following table presents data obtained by subjecting several of trialkyl tetrathiophosphates of the present class and certain trialkyl tetrathiophosphates outside the scope of the invention to the foregoing test procedure.

| Test Compound | | Test Organism | | | | | | |
|---|---|---|---|---|---|---|---|---|
| Tetrathiophosphate | p. p. m. | Rhizoctonia solani | Sclerotium rolfsii | Phytophtora cinnamoni | Pythium ultimum | Sclerotinia sclerotiorum | Sclerotinia fructicola | Botrytis cinerea |
| None | | 5 | 5 | 5 | 5 | 5 | 5 | 5 |
| Trimethyl | 100 | 1 | 1 | 1 | 1 | 1 | 1 | 1 |
| Do | 1,000 | 1 | 1 | 1 | 1 | 1 | 1 | 1 |
| Dimethyl isopropyl | 100 | 2 | 1 | 1 | 3 | 2 | 2 | 2 |
| Do | 1,000 | 1 | 1 | 1 | 1 | 1 | 2 | 1 |
| Methyl di-isopropyl | 100 | 3 | 2 | 2 | 3 | 3 | 2 | 2 |
| Do | 1,000 | 2 | 1 | 1 | 1 | 3 | 2 | 2 |
| Tri-ethyl | 100 | 3 | 2 | 5 | 3 | 3 | 2 | 3 |
| Do | 1,000 | 3 | 2 | 4 | 3 | 3 | 2 | 3 |
| Tri-isopropyl | 100 | 4 | 3 | 5 | 5 | 5 | 4 | 4 |
| Do | 1,000 | 3 | 3 | 5 | 3 | 5 | 4 | 4 |
| Tri-sec.-amyl | 100 | 5 | 5 | 5 | 5 | 5 | 5 | 5 |
| Do | 1,000 | 3 | 4 | 4 | 3 | 1 | 4 | 3 |
| Tri-n-dodecyl | 100 | 5 | 5 | 5 | 5 | 5 | 5 | 5 |
| Do | 1,000 | 4 | 4 | 4 | 4 | 4 | 4 | 4 |

The average of the ratings for the various compounds tested above may be summarized as follows:

| Tetrathiophosphate Tested | Average Rating for all Test Organism | |
|---|---|---|
| | 100 p. p. m. | 1,000 p. p. m. |
| Trimethyl | 1.00 | 1.00 |
| Dimethyl isopropyl | 1.86 | 1.14 |
| Methyl di-isopropyl | 2.43 | 1.72 |
| Tri-ethyl | 3.0 | 2.86 |
| Tri-isopropyl | 4.3 | 3.86 |
| Tri-sec.-amyl | 5.0 | 3.14 |
| Tri-n-dodecyl | 5.0 | 4.0 |

It is to be noted that only the compounds in which at least two of the alkyl groups are methyl had ratings below 2.0 at 100 p. p. m. and below 1.5 at 1000 p. p. m., and that the previously known tridodecyl tetrathiophosphate was substantially inactive.

Other modes of applying the principle of our invention may be employed instead of those explained, change being made as regards the materials or methods employed, provided the products or compositions stated by any of the following claims, or the equivalent of such stated products or compositions be obtained.

We, therefore, particularly point out and distinctly claim as our invention:

1. A fungicidal composition comprising as the essential active ingredient a dimethyl alkyl tetrathiophosphate of the general formula:

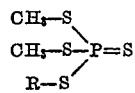

wherein R represents an alkyl group containing from 1 to 6 carbon atoms, and an inert fungicidal adjuvant as a carrier therefor.

2. A composition as defined by claim 1 wherein the said active ingredient is trimethyl tetrathiophosphate.

3. A composition as defined by claim 1 wherein the said active ingredient is dimethyl isopropyl tetrathiophosphate.

4. A composition as defined by claim 1 wherein the said carrier comprises water and sufficient of a dispersing agent to maintain the active ingredient dispersed in said water.

5. A fungicidal composition comprising trimethyl tetrathiophosphate as the essential active ingredient, water, and sufficient of a dispersing agent to maintain said active ingredient dispersed in the water.

6. The method of preventing and controlling the growth of fungi on plant material which comprises applying thereto an effective amount of a dimethyl alkyl tetrathiophosphate of the general formula:

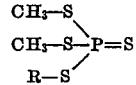

wherein R represents an alkyl group containing from 1 to 6 carbon atoms.

7. The method of claim 6 wherein said tetrathiophosphate is trimethyl tetrathiophosphate.

8. The method of claim 6 wherein said tetrathiophosphate is dimethyl isopropyl tetrathiophosphate.

9. The method of claim 6 wherein the said tetrathiophosphate is applied in the form of an aqueous dispersion.

References Cited in the file of this patent

UNITED STATES PATENTS

| 2,426,691 | Jenkins | Sept. 2, 1947 |
| 2,460,043 | Teeters | Jan. 25, 1949 |
| 2,494,126 | Hoegberg | Jan. 10, 1950 |
| 2,494,283 | Cassaday et al. | Jan. 10, 1950 |
| 2,552,574 | Moyle et al. | May 15, 1951 |
| 2,589,326 | Oberright | Mar. 18, 1952 |

OTHER REFERENCES

Kosolapoff: "Organic-Phosphorus Compounds," pp. 258–9 (1950).